(12) United States Patent
Smith

(10) Patent No.: US 6,581,326 B1
(45) Date of Patent: Jun. 24, 2003

(54) TELESCOPING DEVICE EMPLOYING A SPRAY INSECTICIDE FOR USE WITH ELEVATED INSECT NESTS

(76) Inventor: Keith Smith, 9241 Potter, Davison, MI (US) 48423

(*) Notice: Subject to any disclaimer, the term of this patent is extended or adjusted under 35 U.S.C. 154(b) by 0 days.

(21) Appl. No.: 10/021,545

(22) Filed: Dec. 12, 2001

(51) Int. Cl.$^7$ ................................................ A01M 1/20
(52) U.S. Cl. ......................................... 43/132.1; 43/124
(58) Field of Search ........................... 43/124, 125, 126, 43/127, 128, 129, 130, 131, 132.1, 133, 134, 135, 136, 110; 239/152, 153, 154

(56) References Cited

U.S. PATENT DOCUMENTS

| | | | | |
|---|---|---|---|---|
| 800,029 A | * | 9/1905 | Terletzky | 43/134 |
| 864,953 A | * | 9/1907 | Craig | 401/188 R |
| 1,212,225 A | * | 1/1917 | Hunt | 43/134 |
| 1,534,734 A | * | 4/1925 | Porter | 43/125 |
| 2,896,239 A | * | 7/1959 | Bugbird | 15/144.1 |
| 3,676,949 A | | 7/1972 | Ramsey | 43/124 |
| 4,648,202 A | * | 3/1987 | Renth | 43/132.1 |
| 4,823,505 A | | 4/1989 | Jackson | 43/124 |
| 4,839,985 A | | 6/1989 | Barry | 43/132.1 |
| 5,309,669 A | | 5/1994 | Jackson | 43/124 |
| 5,429,305 A | * | 7/1995 | Munsey | 239/152 |
| 5,537,777 A | * | 7/1996 | Geeting | 43/134 |
| 5,794,847 A | | 8/1998 | Stocker | 239/8 |
| 6,067,746 A | * | 5/2000 | Kistner et al. | 43/136 |
| 6,158,089 A | * | 12/2000 | Monahan et al. | |
| 6,199,766 B1 | | 3/2001 | Fox et al. | 239/3 |
| 6,205,702 B1 | | 3/2001 | Ammons | 43/132.1 |

FOREIGN PATENT DOCUMENTS

| | | | |
|---|---|---|---|
| DE | 3229583 | * | 2/1984 |
| WO | WO 91/05468 | * | 5/1991 |

\* cited by examiner

Primary Examiner—Peter M. Poon
Assistant Examiner—David J Parsley
(74) Attorney, Agent, or Firm—Gifford, Krass, Groh, Sprinkle, Anderson & Citkowski, P.C.

(57) ABSTRACT

A device supporting an insecticide container in actuating fashion for engaging an insect nest. The insecticide is provided as a conventional aerosol spray which includes a depressible head. First and second elongated and telescopically attached members define proximal and distal ends. A handle at the proximal end includes an axial extending slot. A button projection from the first elongated member extends through the slot and permits the handle a degree of axial movement. A platform is arranged at the distal end of the elongated members and supports thereupon the insecticide container. A pair of elongated and telescopically attached rods extend between the handle and the platform and, upon actuation of the handle, axially displaces the platform in a direction towards a tab extending in fixed manner from the distal end of the telescopically attached members, engaging against the depressible container head to actuate the spray container.

20 Claims, 3 Drawing Sheets

TELESCOPING DEVICE EMPLOYING A SPRAY INSECTICIDE FOR USE WITH ELEVATED INSECT NESTS

BACKGROUND OF THE INVENTION

1. Field of the Invention

The present invention relates generally to insect removal devices and assemblies. More particularly, the present invention discloses a novel and improved elongated and telescoping device which is configured to employ a conventional spray insecticide, such as is commonly found in an aerosol can, and in order to eliminate such as flying insect nests, these nests typically being located at much higher elevations than are typically (or safely) accessible by an individual from the ground or even by ladder.

2. Description of the Prior Art

Prior art devices are known which attempt to eliminate or dispose of insect nests, and again in particular, elevated nests not easily accessible from a ground location. The objective in each instance is to remove the insect nest with both the maximum degree of accessibility and safety for the operator.

U.S. Pat. No. 6,205,702, issued to Ammons, discloses an environmentally safe insect control system for incapacitating a nest of insects and without utilizing any form of chemicals. The device includes a telescoping tube, a carbon dioxide tank (strapped to the back of the user), a tube extending from the tank and along the telescoping tube, and a nozzle extending from a distal end of the telescoping tube and for dispersing the carbon dioxide. Further disclosed is a capturing structure (in the form of either a substantially transparent bowl-like structure or a ring member with tightenable drawstring) also attached to the distal end of the telescoping tube for capturing portions of the nest and insects.

U.S. Pat. No. 4,839,985, issued to Barry, discloses another interesting variant of a nest extermination kit and which includes a spring loaded trigger actuated gun with a sighting arrangement which enables the propelling of an insect-destroying projectile. The kit further includes an elongated and segmented pole for manual manipulation to actuate a remote co-acting plural jaw arrangement to grasp and remove remaining nest-like structures.

SUMMARY OF THE PRESENT INVENTION

The present invention, as previously explained, is a novel and improved elongated/telescoping device which is configured to employ a conventional spray insecticide, such as is commonly found in an aerosol can, and in order to eliminate such as flying insect nests. As indicated by the prior art, such insect nests typically are located at elevations that are not typically (or safely) accessible by an individual from the ground. The advantage of the present invention is that it provides a novel and improved structure with which can be utilized a conventional insect spray can (such as, again, an aerosol) and for directing an actuable spray of that can toward a nest at an elevated and otherwise inaccessible location.

The device includes first and second telescopically attached members defining, in combination, a proximal end and a distal end and which may further be adjustable to varying lengths by virtue of spaced apart apertures defined along the outer of the telescoping members. A selective aperture is engaged by an outwardly biased and depressible projection extending from the inner of the telescoping members. A handle connects to the proximal end of the first telescopically attached member and is axially displaceable a limited distance with respect thereto by virtue of an extending slot through which is received a projecting button or tab from the first member.

A platform is arranged at the distal end of the second telescopically attached member and supports thereupon the insecticide container. The platform typically includes an axially extending portion and an angled bottom support portion. A further sleeve portion secures to the platform and in turn is dimensioned to be slidably engaged over the second elongated member.

First and second telescoping rods define, in combination, a proximal end and a distal end and, similarly to the main telescoping members, are adjustable to varying axial lengths. The proximal end of the telescoping rods engages the handle and the distal end engages an underside of the platform.

In order to actuate the platform a limited axial distance, the handle is displaced relative to the first telescopically attached member and the platform is likewise displaced by virtue of the upward motion created by the rods. A fixed and cross wise extending tab projects from the distal end of the second telescopically attached member and, upon displacement of the handle and rod, the platform is axially displaced in a like direction to forcibly engage the depressible head of the container against the tab.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1:
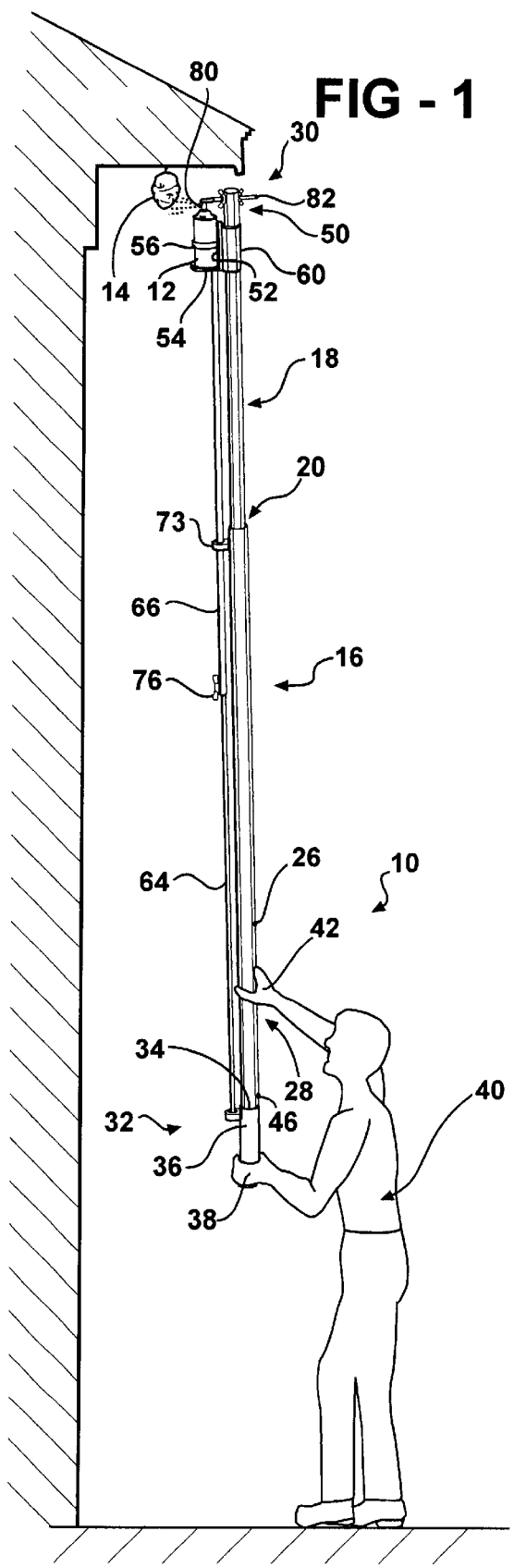
FIG. 1 is an operational view illustrating of the telescoping device with the conventional spray insecticide mounted at an elevated end location, and in which the user actuates the handle to activate the insecticide spray according to the present invention.
Figure 3:
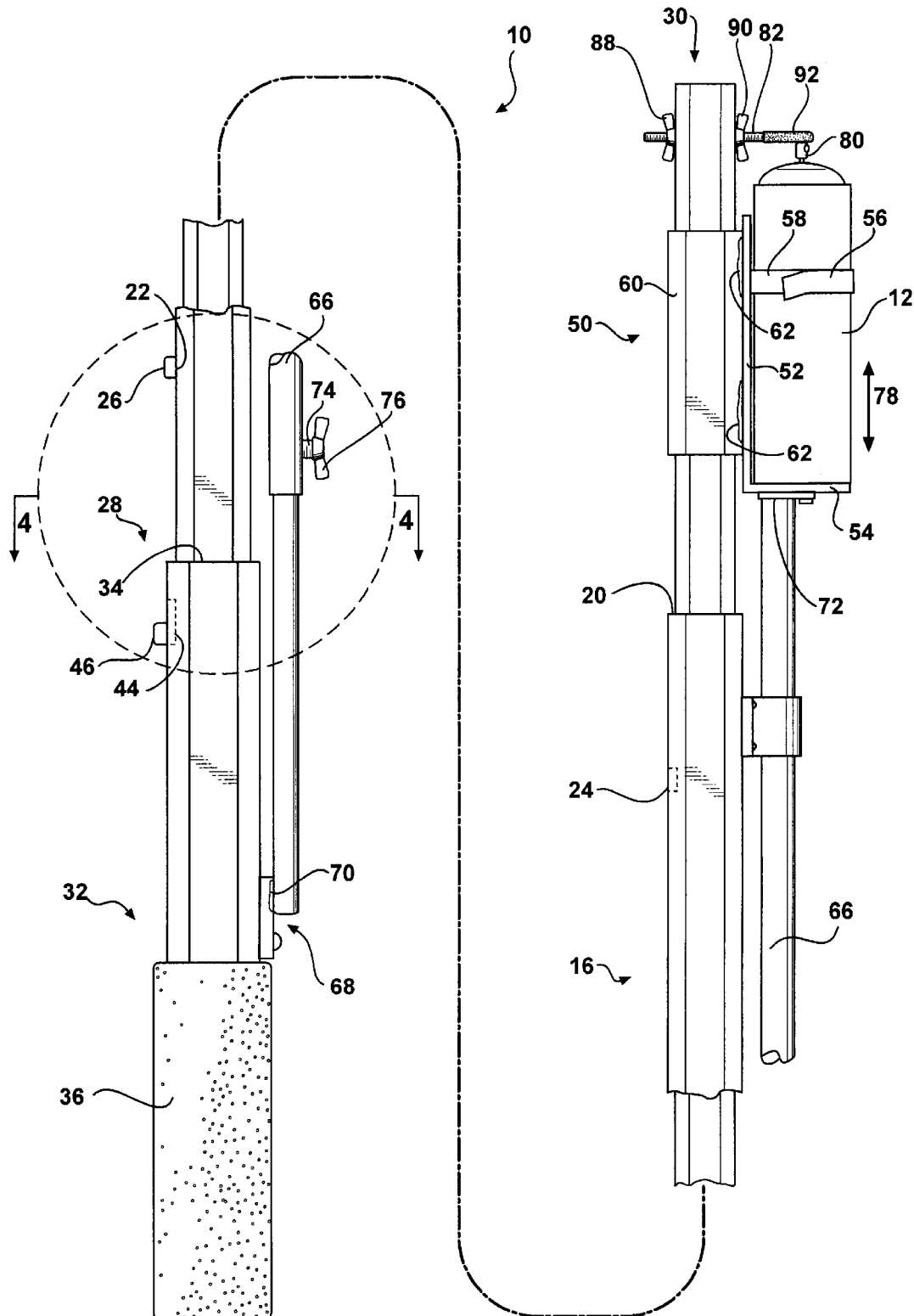
FIG. 3 is an exploded view, in partially reduced fashion, of the telescoping device and which illustrates in enlarged detail the features of the first and second telescoping tubes and corresponding first and second telescoping rods for providing both adjustment and actuation of the spray container supporting platform.

Referring now to FIGS. 1 and 3, a novel and improved elongated and telescoping device is illustrated at 10 which is configured to employ a conventional spray insecticide, such as is commonly found in an aerosol can 12, in order to eliminate flying insect nests (see at 14 in FIG. 1), these nests typically being located at much higher elevations than are typically (or safely) accessible by an individual from the ground or even by ladder. As previously explained, the present invention is a significant improvement over prior art attempts to remove insect nests (such as in particular wasp, bee and hornet nests), owing to the ability of the present device to be utilized with conventional and inexpensive spray insecticides.

The device 10 includes at least one, and preferably, first 16 and second 18 elongated and telescopically attached members. In the preferred variant, the first telescoping member 16 possesses a specified length, width and thickness and defines an internally hollowed and outer extending member; the second telescoping member 18 defines likewise a specified length, width and thickness and is an elongate extending (typically also internally hollowed) member which is telescopically received in coaxial inserting fashion within an extending end 20 of the first extending member 16.

The first and second telescopically attached members are preferably constructed of a durable and lightweight material, such as including a strong lightweight steel, aluminum, mixed alloy or even a injection molded plastic or polymer based material. To effectuate a wide range of adjustability, a plurality of apertures 22 and 24 (see in particular exploded view of FIG. 3) are defined at opposite end locations of the first elongated, outer and telescopically attached member 16 and in spaced apart and axially extending fashion. An outwardly biased and depressible projection 26, such as a spring loaded button, extends laterally from the second elongated, inner and telescopically inserted member 18.

Upon axially spacing the second member 18 to a specified position relative to the first member 16, and upon which a selected aperture 22 or 24 is aligned with the outwardly biased and depressible projection 26, the projection seats through the selected aperture and locks the members 16 and 18 in place. A desired telescoping and axially extending length is thereby established extending between a proximal end 28 of the first member 16 and a distal end 30 of the second member 18. As is also evident from the drawing illustrations, the first 16 and second 18 tubular members each include a polygonal cross sectional shape (octagonal in the illustrated embodiment but not limited to any number of sides) and so that individuals members 16 and 18 will not rotatively displace relative to one another either when fixed in place or axially adjusted.

An elongated handle 32 connects to the proximal end 28 of the telescopically attached members 16 and 18. The handle 32 is typically constructed of a similar material as the telescoping members 16 and 18 and likewise includes a polygonal (octagonal) cross sectional configuration. The handle 32 is dimensioned and further defined by an internally hollowed and extending tubular portion with an open end 34 so that the proximal end 28 of the first telescoping member 16 may be received therein. The handle 32 typically also includes a padded (such as typically rubberized) portion 36 at an opposite end and which is suitable for grasping by a first selected hand 38 of an individual 40, and while a second hand 42 grasps a suitable location along the first telescoping member 16.

An axial slot is defined by a continuous and enclosed inner facing edge 44 (see in particular FIG. 4) defined in the handle 32, preferably at a location proximate its open end 34. A suitable projection 46 is evident extending from the first telescoping member 16 and, while the projection 46 can be fixed in place. It is also envisioned that a depressible and outwardly spring-biased button or other suitable element can be employed, this making possible the handle 32 to be dismounted from the elongated telescoping member 16 by depressing the projection 46 and withdrawing the proximal end 28 of the telescoping members from the open end 34 of the handle 32. As will be further described in some additional detail, the function of the slot 44 and projection 46 is to permit the handle to axially displace a selected distance in opposite directions relative to the telescoping members 16 and 18 (see arrow 48 in FIG. 4).

A platform 50 is positioned at a location proximate and just short of the distal end 30 of the telescoping members (inner and second member 18). The platform includes an axially extending portion 52 and an angled bottom support portion 54 which define in combination an angled bracket for supporting thereupon the insecticide container 12. VELCRO, i.e., releasably interengageable strap fasteners 56 and 58, or other suitable fasteners, may be employed for securing the container 12 upon the extending 52 and angled bottom support 54 portions. It is also contemplated that the angled bracket 56 and 58 components of the platform may be substituted by a substantially cage-shaped (not shown) construction and which may be typically constructed of a plastic injection molded material. The purpose for such an alternate construction is to biasingly receive and engage about the conventional spray can 12 without the necessity of additional strap fasteners or the like.

Additionally included with the platform 50 is an internally hollowed and open-ended sleeve 60, securing to the extending bracket portion 52 by welds or the like (see at 62 in FIG. 3). The sleeve 60 is preferably octagonal shaped in cross section and possessing of a specific inner dimension which permits it to slidably engage over the second elongated member 18.

In order to facilitate limited axial displacement of the sleeve 60 (as well as associated brackets 52 and 54 and supported spray container 12) a pair of first 64 and second 66 elongated rods (each again having a specified length, width and thickness) are provided and which are secured together in telescopically engaged and extensible fashion. A proximal end 68 (of the first telescopically attached rod 64) is connected (such as again by welds 70 as shown in FIG. 3) to a location along the handle 32; whereas a distal end 72 (of the second telescopically attached rod 66) is secured to an underside location of the angled bottom support bracket 54 forming a portion of the platform 50. Additionally, another sleeve portion 73 is defined extending from an exterior edge location of the telescopically connected members.

Figure 2:
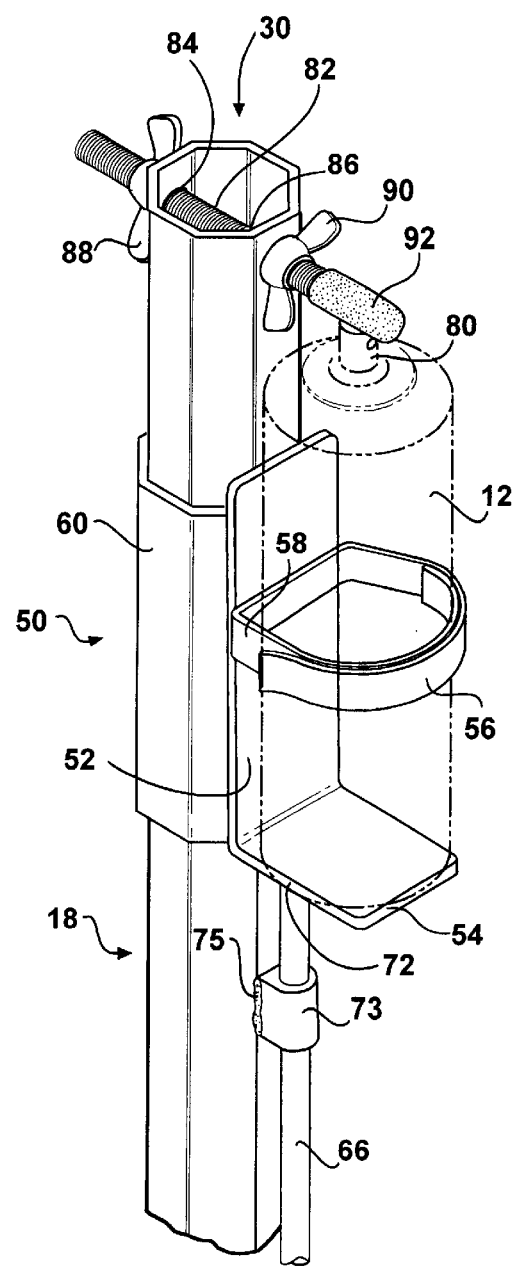
FIG. 2 is an enlarged sectional view in perspective and illustrating the axially movable platform upon which is mounted the conventional insect spray container to move into and out of contact with the fixed depressor tab according to the present invention.

Referring to FIG. 1, the sleeve portion is illustrated at 73 and is defined at a location proximate an extending end of the first member 16 for providing axially guiding support to the rod (see again telescoping rod 66). Referring further to FIG. 2, it is also envisioned that sleeve portion 73' can be located (such as again by welds 75) at a further location upon the second rod 66 and closer to the distal end. It is also envisioned that additional sleeved or similar guiding/channeling portions may be employed at axially extending locations along the main tubular members 16 and 18 and within the scope of the invention.

According to the preferred embodiment illustrated, axial adjustment for establishing an overall length between the proximal and distal ends of the telescoping rods 64 and 66 includes the first rod 64 defining an inner telescoping portion and the second rod 66 an outer telescoping portion within which an associated end of the first rod 64 extends. A cross wise aperture 74 defined in the outer telescoping portion 66 (typically proximate the inserting location of the first rod 64) receives therethrough in threadably rotating/engagable fashion a fastener (such as wing nut 76).

Figure 4:
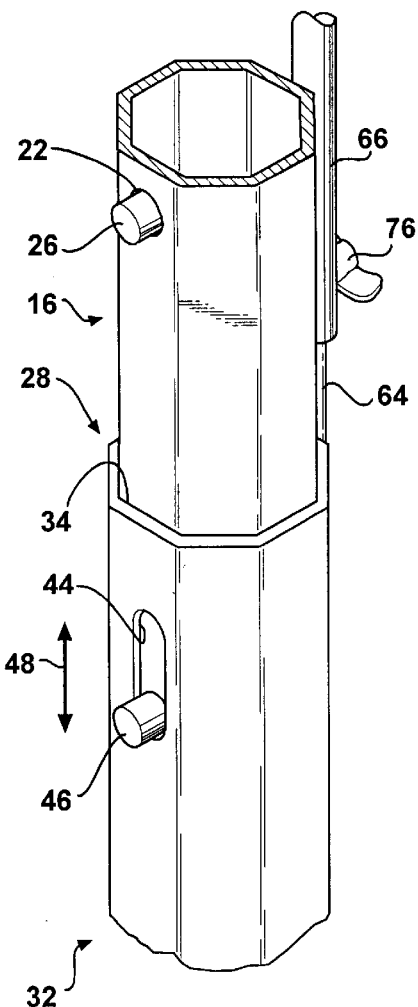
FIG. 4 is an enlarged partial view, taken from the area indicated at 4—4 in FIG. 3, and illustrating in better detail the button and channel arrangement established within the handle and, in cooperation with the telescoping tubes and rods, providing the limited range of axial displacing motion of the spray container supporting platform.

The wing nut fastener 76 may be selectively loosened, to allow the first (inner) rod 64 to slide in an out of the second (outer) rod 66, both the first 64 and second 66 rods being anchored in place at the opposite proximal 68 and distal 72 securing locations. Upon retightening the wing nut 76, a selected axial arrangement is established between the first 64 and second 66 rods coinciding with the selected axial adjustment of the first 16 and second 18 telescoping members. As is also fairly clear from the drawing illustrations, the first 64 and second 66 rods are constructed of a size and dimension typically less than that of the (main) tubular members 16 and 18 and the rods serve to transfer the axial displacement of the handle 32 (relative the first tubular member 16) to the platform 50, which in turn axially displaces the can 12, see 78 in FIG. 3, in first and second axial directions coinciding with the range of displacement of the arrow 48 in FIG. 4 illustrating the range of motion of the handle 32.

Figure 5:
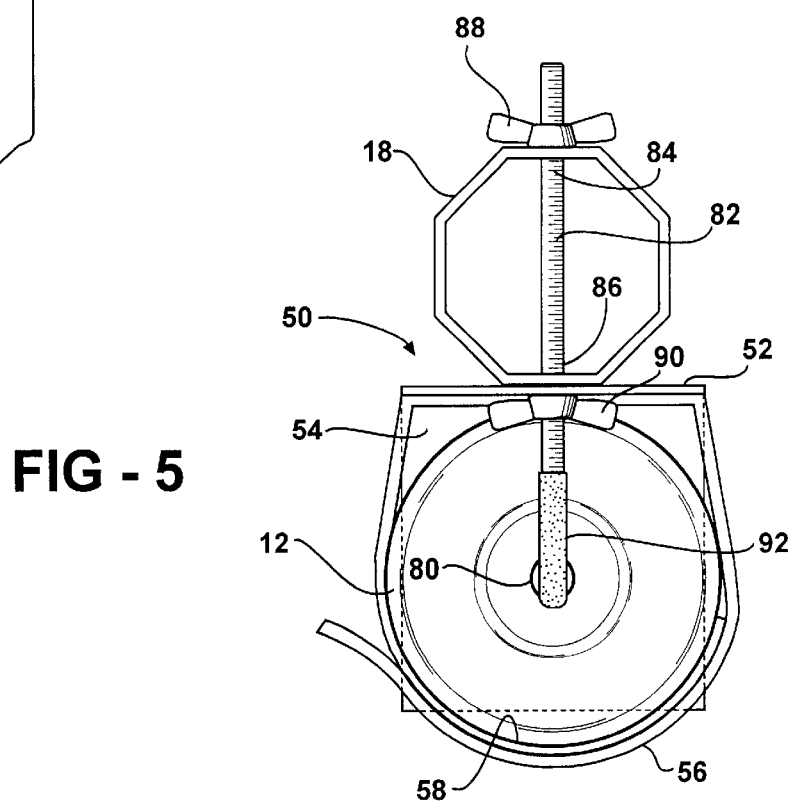
FIG. 5 is a top end view of the telescoping device and illustrating in additional detail the manner in which the length adjustable and fixed depressor tab is secured proximate the extending end of the second telescoping tube and for selectively engaging the conventional spray head portion of the spray container upon being axially displaced by the supporting platform.

In order to actuate the spray head portion of the container (see at 80 in FIGS. 1, 2 and 5) a fixed tab 82 extends from a location proximate the distal end 30 of the telescopically connected member 18 and in a desired, spaced and overhanging fashion above the supported spray container 12. The tab 82 in the preferred embodiment is an elongated and exteriorly threaded element which is threadably engaged through a pair of apertures 84 and 86 (see FIGS. 2 and 5) defined in crosswise extending fashion through the second elongated member 18 proximate its distal end 30.

A pair of wing nut fasteners 88 and 90 threadably secure, respectively, over the exteriorly threaded configuration of the elongated fastener/tab 82 and against the apertures 84 and 86 (respectively). The nut fasteners 88 and 90 are selectively adjustable and so that a given projecting length of the tab is established in overhanging fashion above said displaceable platform 50. A rubberized cap element 92 (optional) may be installed over the extending length of the tab 82 and, upon translating the platform in the upwards axial direction, assists in biasingly engaging and depressing the spray head 80 of the container 12.

As is clearly evident, the ability to adjust the extending length of the tab 82 permits it to engage spray containers of varying configuration. The extending overall length of the rods 64 and 66 is further adjusted so that, given the amount of axial displacement created by the handle 32, the spray head 80 of the container will be adequately contacted and biased downwardly by the fixed tab 82.

Having described my invention, additional preferred embodiments will become apparent to those skilled in the art. In particular, it is within the realm of the invention that a larger plurality of tubular engageable main members and rods could be employed. Alternatively, and although somewhat limiting in its application, a single elongated main member and extending rod could be employed in substitution to tubular extensible variants. Additionally it is envisioned that the pivoting rods, while providing the preferred and presently easiest manner in which the spray head portion of the container is actuated, are capable of being substituted by another type of actuating or trigger mechanism to activate the spray container head, either again by lifting the platform associated with the container or, in some envisioned situations, by making the tab movable into contact with the spray head and without deviating from the scope of the appended claims.

I claim:

1. A device capable of supporting an insecticide container for use against an insect nest, the insecticide container including a depressible head, said device comprising:

at least one elongated member having a proximal end and a distal end;

a handle connecting to said proximal end of said elongated member and being axially displaceable a limited distance with respect thereto;

a platform arranged at said distal end of said elongate member and supporting thereupon the insecticide container;

actuating means for displacing said platform a limited axial distance in response to actuation of said handle relative to said elongated member; and a tab extending from said distal end of said elongated member and, upon actuation of said handle, forcibly engaging and depressing the head of the container.

2. The device as described in claim 1, said at least one elongated member further comprising first and second telescoping members, said handle connecting to a proximal end of said first telescoping member, said platform being arranged at a distal end of said second telescoping member.

3. The device as described in claim 2, further comprising axial adjusting means for establishing an overall length between said proximal end of said first member and said distal end of said second member.

4. The device as described in claim 3, further comprising a plurality of apertures defined in said first elongated member in spaced apart and axially extending fashion, an outwardly biased and depressible projection extending laterally from said second elongated member and, upon axially spacing said second member as an inner telescoping member relative to said first member, said projection seating through a selected aperture of said first elongated member.

5. The device as described in claim 3, said actuating means further comprising at least one elongated rod, a proximal end of said rod fixedly engaged to said handle, said rod being guided in axially extensible fashion along said elongated members so that a distal end thereof engages said platform.

6. The device as described in claim 5, said at least one elongated rod further comprising first and second telescoping rods, a proximal end of said first rod engaging said handle, a distal end of said second rod engaging said platform.

7. The device as described in claim 6, further comprising axial adjusting means for establishing an overall length between said proximal end of said first rod and said distal end of said second rod.

8. The device as described in claim 7, further comprising said first rod defining an inner telescoping portion and said second rod an outer telescoping portion, an aperture in said outer telescoping portion receiving therethrough a threadably engagable fastener, said fastener being selectively loosened and retightened for fixing a selected axial arrangement established between said first and second rods upon establishing a desired axial adjustment of said first and second telescoping members.

9. The device as described in claim 5, said actuating means further comprising a slot extending in axial fashion along said handle, a projection from said first elongated member seating within said slot.

10. The device as described in claim 9, said handle further comprising a cushioned end portion.

11. The device as described in claim 5, further comprising said platform having an axially extending portion and an angled bottom support portion, a sleeve portion securing to said platform and which is slidably engaged over said second elongated member to be engaged by said distal end of said elongated rod.

12. The device as described in claim 1, further comprising Velcro fasteners for securing the container upon said platform.

13. The device as described in claim 1, said tab further comprising an elongated and exteriorly threaded element which is threadably engaged with at least one aperture defined in crosswise extending fashion through said distal end of said elongated member, at least one fastener securing said tab according to a defined overall extending length and in overhanging fashion above said displaceable platform.

14. The device as described in claim 2, said first and second telescoping members being constructed from a durable and lightweight material.

15. A device capable of supporting an insecticide container for engaging an insect nest, the insecticide container including a depressible head, said device comprising:
    at least first and second elongated and telescopically attached members defining, in combination, a proximal end and a distal end;
    a handle located at said proximal end of said telescopically attached members;
    a platform arranged at said distal end of said telescopically attached members and supporting thereupon the insecticide container;
    a tab extending from said distal end of said telescopically attached members and in overhanging fashion above said platform; and
    actuating means associated with said handle for engaging said tab against the depressible container head and to actuate the spray container.

16. A telescoping device capable of supporting an insecticide container in selectively actuating fashion for engaging an insect nest, the insecticide container including a depressible head, said device comprising:
    first and second telescopically attached members defining, in combination, a proximal end and a distal end and being adjustable to varying lengths;
    a handle connecting to said proximal end of said telescopically attached members and being axially displaceable a limited distance with respect thereto;
    a platform arranged at said distal end of said telescopically attached members and supporting thereupon the insecticide container, a sleeve portion securing to said platform and in turn being slidably engaged over said second telescoping member;
    first and second telescoping rods defining, in combination, a proximal end and a distal end and being adjustable to varying axial lengths, said proximal end of said telescoping rods engaging said handle and said distal end engaging said platform;
    actuating means for displacing said platform a limited axial distance along said second telescoping member and in response to actuation of said handle relative to said first telescoping member, said actuating means further comprising a slot extending in axial fashion along said handle, a projection from said first telescoping member seating within said slot; and a fixed and cross wise extending tab projecting from said distal end of said second telescoping member and, upon actuation of said handle, said platform being axially displaced in a selected direction to forcibly engage the depressible head of the container against said tab.

17. A device capable of supporting an insecticide container for use against an insect nest, the insecticide container including a depressible head, said device comprising:
    first and second telescoping members;
    a handle connecting to a proximal end of said first elongated member and being axially displaceable a limited distance with respect thereto;
    a platform arranged at a distal end of said second elongate member and supporting thereupon the insecticide container;
    axial adjusting means for establishing an overall length between said proximal end of said first member and said distal end of said second member;
    actuating means for displacing said platform a limited axial distance in response to actuation of said handle relative to said elongated member, said actuating means further comprising at least one elongated rod, a proximal end of said rod fixedly engaged to said handle, said rod being guided in axially extensible fashion along said elongated members so that a distal end thereof engages said platform;
    said platform having an axially extending portion and an angled bottom support portion, a sleeve portion securing to said platform and which is slidably engaged over said second elongated member to be engaged by said distal end of said elongated rod; and
    a tab extending from said distal end of said elongated member and, upon actuation of said handle, forcibly engaging and depressing the head of the container.

18. The device as described in claim 17, said platform being constructed of a metal, further comprising welds for securing said platform to said sleeve portion and said distal end of said elongated rod.

19. The device as described in claim 17, at least one of said platform, said sleeve and said rod being constructed of an injection molded plastic.

20. A device capable of supporting an insecticide container for use against an insect nest, the insecticide container including a depressible head, said device comprising:
    first and second telescoping members;
    a handle connecting to a proximal end of said first elongated member and being axially displaceable a limited distance with respect thereto;
    a platform arranged at a distal end of said second elongate member and supporting thereupon the insecticide container;
    axial adjusting means for establishing an overall length between said proximal end of said first member and said distal end of said second member;
    actuating means for displacing said platform a limited axial distance in response to actuation of said handle relative to said elongated member, said actuating means further comprising first and second telescoping rods, a proximal end of said first rod engaging said handle, said rod being guided in axially extensible fashion along said elongated members and so that a distal end of said second rod engages said platform;
    axial adjusting means for establishing an overall length between said proximal end of said first rod and said distal end of said second rod, said first rod defining an inner telescoping portion and said second rod an outer telescoping portion, an aperture in said outer telescoping receiving therethrough a threadably engageable fastener, said fastener being selectively loosened and retightened for fixing a selected axial arrangement established between said first and second rods upon establishing a desired axial adjustment of said first and second telescoping members; and a tab extending from said distal end of said elongated member and, upon actuation of said handle, forcibly engaging and depressing the head of the container.

* * * * *